United States Patent
Pinson (10) Patent No.: US 6,598,475 B2
(45) Date of Patent: Jul. 29, 2003

(54) MICROMECHANICAL INERTIAL SENSOR HAVING INCREASED PICKOFF RESONANCE DAMPING

(75) Inventor: John C. Pinson, Anaheim, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/957,425

(22) Filed: Sep. 20, 2001

(65) Prior Publication Data

US 2003/0061878 A1 Apr. 3, 2003

(51) Int. Cl.[7] .............................. G01P 9/04; G01C 19/00
(52) U.S. Cl. .................................. 73/504.12; 73/504.16
(58) Field of Search ........................ 73/504.02, 504.04, 73/504.12, 504.13, 504.14, 504.15, 504.16, 514.32, 514.29, 514.15, 514.16; 310/329, 370

(56) References Cited

U.S. PATENT DOCUMENTS

| | | | |
|---|---|---|---|
| 4,654,663 A | * 3/1987 | Alsenz et al. | ........ 310/360 |
| 4,671,112 A | 6/1987 | Kimura et al. | |
| 4,694,696 A | 9/1987 | Hojo et al. | |
| 5,014,554 A | 5/1991 | Terada et al. | |
| 5,349,855 A | 9/1994 | Bernstein et al. | |
| 5,438,231 A | 8/1995 | Khoshnevisan et al. | |
| 5,476,008 A | 12/1995 | Pinson | |
| 5,496,436 A | 3/1996 | Bernstein et al. | |
| 5,757,107 A | 5/1998 | Wakatuki et al. | |
| 5,783,973 A | 7/1998 | Weinberg et al. | |
| 5,861,705 A | 1/1999 | Wakatsuki et al. | |
| 5,911,156 A | * 6/1999 | Ward et al. | ........ 73/504.16 |
| 5,920,012 A | 7/1999 | Pinson | |
| 5,987,986 A | 11/1999 | Wyse et al. | |

FOREIGN PATENT DOCUMENTS

| | | |
|---|---|---|
| EP | 0 900 999 A | 3/1999 |
| EP | 1 193 215 A | 4/2002 |
| WO | WO 01 22094 A | 3/2001 |

\* cited by examiner

*Primary Examiner*—Helen Kwok (57) ABSTRACT

A micromechanical inertial sensor is provided having a reduced pickoff Q, while maintaining a high motor Q. The micromechanical inertial sensor includes a pair of proof masses and aligned pickoff plates. Each pickoff plate is spaced from the respective proof mass by a gap that varies in response to out-of-plane movement of the proof mass. The micromechanical inertial sensor also includes at least one voltage source for providing charge to the pickoff plates. By measuring the movement of charge in each electrical circuit that includes a pickoff plate as the gap between the pickoff plate and the respective proof mass varies, a measurement of the rotation of the micromechanical inertial sensor about an input axis may be obtained. The micromechanical inertial sensor further includes resistive elements disposed in series between the voltage source and each pickoff plate to increase the pickoff resonance damping of the micromechanical inertial sensor.

14 Claims, 3 Drawing Sheets

FIG. 4

MICROMECHANICAL INERTIAL SENSOR HAVING INCREASED PICKOFF RESONANCE DAMPING

FIELD OF THE INVENTION

The present invention relates generally to micromechanical inertial sensors and, more particularly, to micromechanical inertial sensors, such as micromechanical tuning fork gyroscopes, having increased pickoff resonance damping.

BACKGROUND OF THE INVENTION

Micromechanical inertial sensors are increasingly being utilized to detect rotational motions in aircraft, automobiles and other applications because of their ruggedness and small size. For example, in the automotive industry, micromechanical inertial sensors are utilized for leveling controls, anti-spin systems, anti-skid systems and navigation purposes. In the military industry, micromechanical inertial sensors are utilized for missile guidance, smart munitions, tracker buoys, autonomous vehicles, land navigation as well as a myriad of other applications. Moreover, with respect to consumer goods, micromechanical inertial sensors are utilized in virtual reality systems, camcorders, GPS receivers, and the like. In addition to their ruggedness and small size, micromechanical inertial sensors also offer potentially significant cost advantages over competing technologies.

One advantageous micromechanical inertial sensor is a tuning fork gyroscope adapted to sense rotation about a first or input axis. A tuning fork gyroscope generally includes a pair of proof masses driven to vibrate along a second axis substantially perpendicular to the first axis at a predetermined motor frequency. As a result of the manner in which the proof masses are situated with respect to an underlying substrate, movement along the second axis is typically referred to as in-plane motion. In response to rotation about the first axis, the proof masses are subjected to a Coriolis force which, in turn, causes the proof masses to move along a third axis which is substantially perpendicular to both the first and second axes, thereby producing out-of-plane motion. The tuning fork gyroscope also includes pickoff plates or sense electrodes aligned with and spaced from each proof mass such that a gap is defined between each proof mass and the respective pickoff plate. Each pickoff plate is electrically connected to a source of charge, such as a voltage source. As each proof mass moves along the third axis, such as in response to Coriolis forces, the gap between the proof mass and the respective pickoff plate will vary, thereby altering the capacitance between the proof mass and the respective pickoff plate and causing charge to move in the electrical circuit that includes the pickoff plate, i.e., in the sense circuitry. By measuring the movement of charge in the sense circuitry, the tuning fork gyroscope can provide a measurement of the capacitance between each proof mass and the respective pickoff plate and, in turn, angular rate of rotation of the tuning fork gyroscope about the first or input axis. Further details regarding tuning fork gyroscopes are provided by U.S. Pat. No. 5,920,012 to John C. Pinson, the contents of which are incorporated herein in their entirety.

In order to permit the out-of-plane motion, the proof masses are generally suspended above a substrate such that even though the proof masses are mechanically connected to the substrate, each proof mass is capable of vibration or other movement relative to the substrate. As a result of the attachment of the proof masses to the substrate, the proof masses will have both a motor natural resonant frequency for movement along the second axis and a pickoff natural resonant frequency for motion along the third axis. A tuning fork gyroscope also has a motor resonance quality factor (Q) that relates the energy required to drive the vibration of the proof mass along the second axis to the resulting movement of the proof mass at the motor frequency. In order to minimize the energy required to drive the proof mass, the motor Q is preferably as large as possible.

In response to a constant rate of rotation about the first axis, each proof mass will vibrate along the third axis at the motor frequency. In order to mechanically amplify the vibration of the proof masses along the third axis at the motion frequency, the pickoff natural resonant frequency is preferably near, but not equal to, the predetermined motor natural resonant frequency. Typically, for example, the pickoff natural resonant frequency is separated from the predetermined motor natural resonant frequency by one or two kilohertz.

If the tuning fork gyroscope rotates about the first axis at a rate of rotation that varies at a predetermined frequency, Coriolis force on the proof masses is generated simultaneously at two frequencies; namely, motor frequency plus the predetermined frequency, and motor frequency minus the predetermined frequency. Proof mass motion results at these two frequencies simultaneously. When this motion is detected and demodulated using a signal having the motor frequency for the demodulation reference, a signal at the predetermined frequency is recovered. The transfer function between the rate input, i.e., the rate of rotation about the first axis, and the demodulated output of this arrangement, as a function of the particular frequency, is one half the sum of: (1) the pickoff mode response as a function of frequency once the response has been zero frequency shifted to the modulation frequency, i.e., the motor frequency, plus (2) the pickoff mode response as a function of frequency once the response has been zero frequency shifted to minus the modulation frequency, i.e., a negative value equal in magnitude to the motor frequency. Thus there is a large response, depending on the pickoff mode Q as described below, when the particular frequency equals the difference between the motor mode and pickoff mode natural resonant frequencies. Unfortunately, the pickoff resonance has an undesirably large Q, such as 100,000. This large pickoff Q means that the tuning fork gyroscope must be designed such that the input rate transfer function peaks outside the intended input rate bandwidth of the gyroscope. Also, stringent measures must be taken to protect the gyroscope from rate inputs at frequencies equal to the difference between motor mode and pickoff mode natural resonant frequencies, so as to protect the processing electronics from saturation resulting from the very large signal levels.

In order to reduce the deleterious impact of the pickoff resonance on the movement along the third axis at the pickoff natural resonant frequency, it would therefore be desirable to reduce the pickoff Q associated with the movement of the proof mass at the pickoff natural resonant frequency. Unfortunately, prior attempts to reduce the pickoff Q have also disadvantageously reduced the motor Q. For example, the gas pressure of the atmosphere within the housing that contains the micromechanical inertial sensors has been increased in order to reduce the pickoff Q. While the increased gas pressure does reduce the pickoff Q, the motor Q is also reduced, thereby disadvantageously requiring additional energy to cause the proof mass to vibrate to the same degree.

SUMMARY OF THE INVENTION

A micromechanical inertial sensor, such as a micromechanical tuning fork gyroscope, is therefore provided that has a reduced pickoff Q, while still maintaining a relatively high motor Q. As such, the micromechanical inertial sensor of the present invention will have a increased damping at the pickoff natural resonant frequency without substantially altering the response at a predetermined motor frequency. Thus, the micromechanical inertial sensor of the present invention is less susceptible to saturation from input rates of rotation at frequencies outside the useful bandwidth of the sensor.

The micromechanical inertial sensor is adapted to sense rotation about a first or input axis. The micromechanical inertial sensor includes first and second proof masses operably connected to mechanical ground. For example, the proof masses are typically spaced apart from and mechanically connected to a substrate. The proof masses are adapted to vibrate along a second axis substantially orthogonal to the first axis. The proof masses are also moveable along a third axis substantially orthogonal to the first and second axes in response to rotation about the first axis. A micromechanical inertial sensor also includes two pickoff plates in at least partial alignment with respective proof masses. Each pickoff plate is spaced from the respective proof mass by a gap that varies in response to movement of the proof mass along the third axis. The micromechanical inertial sensor also includes voltage sources electrically connected to respective pickoff plates for providing charge to the pickoff plates. By measuring the movement of charge in each electrical circuit that includes a respective pickoff plate as the gap between the pickoff plate and the proof mass varies, a measurement of the capacitive coupling between the pickoff plate and the proof mass is obtained from which a measure of the movement of the proof mass along the third axis and, in turn, a measure of the rotation of the micromechanical inertial sensor about the first axis may be obtained.

According to the present invention, the micromechanical inertial sensor further includes resistive elements disposed in series between the voltage sources and each of the pickoff plates to increase the damping of the pickoff resonance of the micromechanical inertial sensor. In one embodiment, for example, the resistive element is selected such that the pickoff resonance has a Q of no more than 1,000. Advantageously, the resistive element causes no increase in damping of the resonance of the proof masses at the predetermined motor frequency, i.e., at the predetermined frequency at which the proof mass vibrates along the second axis. This is because the capacitance between each proof mass and the respective pickoff plate does not vary as the proof mass moves along the second axis, thus no current is caused to flow in the resistors with this motion. As such, the resistive element may be sized to between 10 kiloohms and 10 megohm and, in one advantageous embodiment, is one megohm.

The micromechanical inertial sensor can also include a plurality of drive electrodes. Correspondingly, each proof mass of this embodiment can carry a plurality of driven electrodes that are interdigitated with the drive electrodes such that electrical stimuli applied to the drive electrodes induces the vibration of each proof mass along the second axis.

By incorporating a resistive element, the pickoff resonance damping of the micromechanical inertial sensor can be increased without significantly adversely impacting the damping of the resonance at the predetermined motor natural resonant frequency. In other words, the Q of the pickoff resonance is substantially decreased, such as to 1,000 or less, without significantly decreasing the motor Q of the micromechanical inertial sensor. Thus, the pickoff resonance will continue to amplify vibration of the proof masses along the third axis at the motor frequency, such as in response to a constant rate of rotation about the first axis. However, the pickoff Q will not cause excessively large vibrations of the proof masses along the third axis in response to the rates of rotation that vary at a frequencies near the separation between the motor natural resonant frequency and the pickoff natural resonant frequency.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
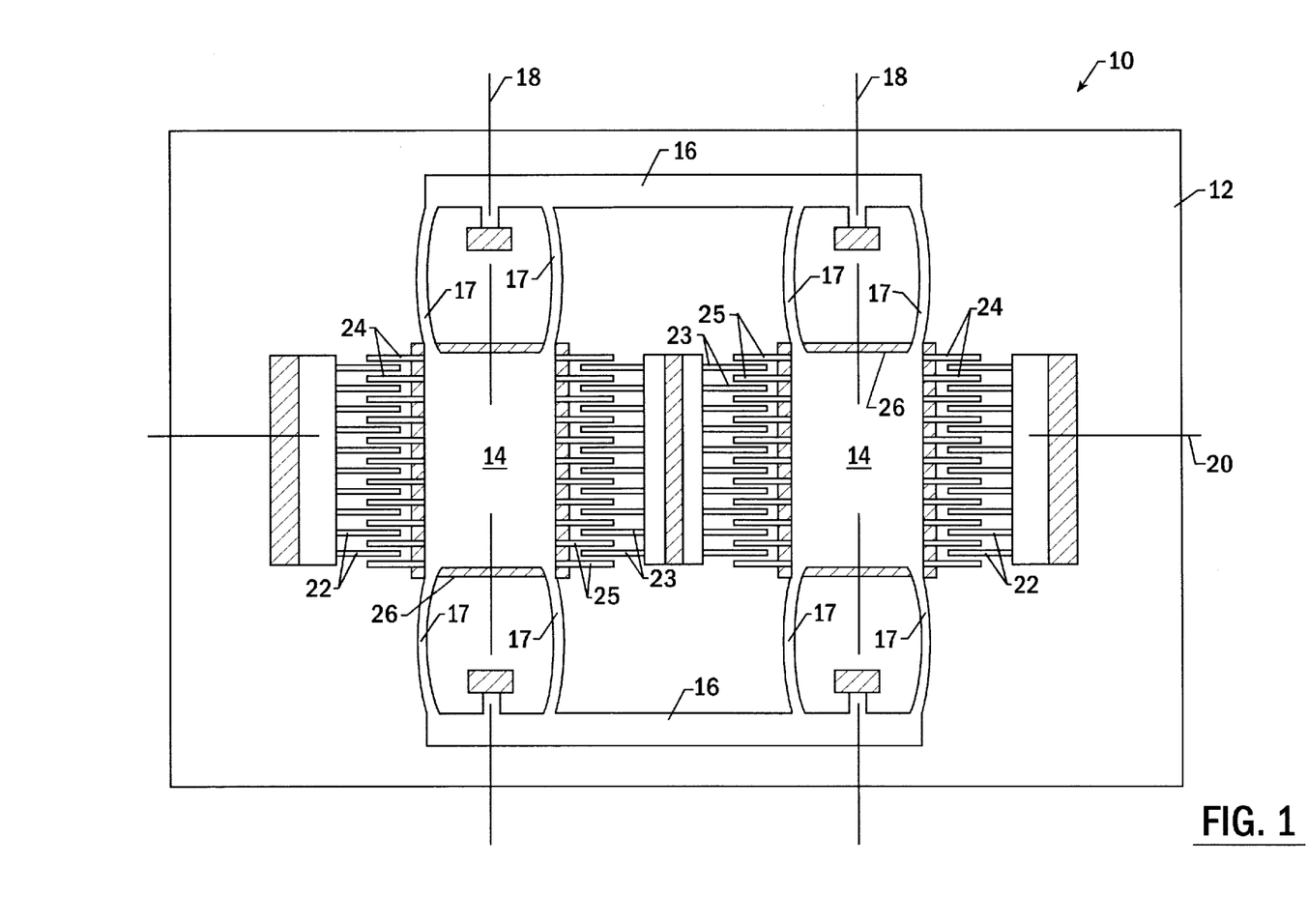
FIG. 1 is a plan view of a micromechanical inertial sensor according to one embodiment of the present invention.

An improved micromechanical inertial sensor 10 is provided according to the present invention. As will be apparent to those skilled in the art, the micromechanical inertial sensor of the present invention can have a variety of configurations. However, the micromechanical inertial sensor of the present invention will be described in conjunction with a tuning fork gyroscope configuration, one example of which is depicted in FIG. 1. However, it should be understood that the micromechanical inertial sensor of the present invention can include other configurations of tuning fork gyroscopes, such as those configurations depicted by U.S. Pat. No. 5,249,855 to Jonathan J. Bernstein et al., the contents of which are incorporated herein in their entirety by reference.

As shown in FIG. 1, the micromechanical inertial sensor 10 includes a substrate 12, such as a glass substrate, which supports a proof mass structure suspended above the substrate. In the illustrated embodiment, the proof mass structure includes first and second proof masses 14 suspended relative to the substrate and spaced apart from both the substrate and one another. While the proof masses may be suspended relative to the substrate in various manners, the micromechanical inertial sensor of the illustrated embodiment includes a pair of cross tie beam structures 16 that extend outwardly or upwardly from the substrate and are connected to the proof masses by means of one or more beams 17. As known to those skilled in the art, the proof mass structure is typically integrally formed by a number of dry etch and dissolved wafer process steps as described in more detail in U.S. Pat. Nos. 5,920,012 and 5,349,855 and as known to those skilled in the art.

As a result of the manner in which the proof masses 14 are suspended relative to the substrate, a coordinate system is defined. In this regard, the micromechanical inertial sensor 10 defines a first or input axis 18 such that rotation of the micromechanical inertial sensor about the first axis can be measured. As described below, the proof masses are driven so as to vibrate along a second axis 20 perpendicular to the first axis, thereby producing in-plane motion. As a result of the suspension of the proof masses relative to the substrate, the proof masses are also adapted to move along a third axis perpendicular to both the first and second axes in response to rotation of the micromechanical inertial sensor about the first axis. The third axis is not depicted, but is directed into and out of the page in FIG. 1 such that movement therealong is termed out-of-plane motion.

In order to cause the proof masses 14 to vibrate along the second axis 20, the micromechanical inertial sensor 10 of the illustrated embodiment includes a plurality of drive electrodes 22 adjacent the outer edges of the proof masses. Correspondingly, the proof masses preferably carry driven electrodes 24 extending outwardly from the outer edges thereof. As illustrated, both the drive electrodes and the driven electrodes are generally teeth-like so as to form comb structures that may be meshed such that the drive electrodes and the driven electrodes are interdigitated. Similarly, the micromechanical inertial sensor may include interdigitated sense electrodes, 23 and 25, disposed between the first and second proof masses. In this regard, sense electrodes 25 are carried by the proof masses and extend outwardly from an inner edge thereof so as to be interdigitated with the plurality of centrally located sense electrodes 23 extending outwardly from a common support.

By supplying appropriate electrical stimuli to the drive and sense electrodes 22 and 23 such as by driving the drive electrodes 22 in an oscillatory manner between two opposite polarities, and driving the sense electrodes 23 with a constant, and connecting the sense charge output signal flowing through the common support and the drive electrodes with suitable circuitry so as to make a self-oscillator loop as known to those skilled in the art, the proof masses 14 will vibrate along the second axis 20. In particular, the proof masses will oscillate at a predetermined motor frequency equal to the natural resonant frequency of the drive or motor mode.

As a result of its construction, rotation of the micromechanical inertial sensor 10 about the first axis 18 will cause the vibrating proof masses 14 to also vibrate or move along the third axis, that is, toward and away from the substrate 12. In order to measure this vibration of the proof masses along the third axis, the micromechanical inertial sensor also includes a sensor system. The sensor system includes pickoff plates 26 disposed on or in the substrate and in at least partial alignment with the respective proof masses. As a result of the suspension of the proof masses relative to the substrate, each pickoff plate is spaced from a respective proof mass by a gap that varies in response to movement of the proof mass along the third axis. While the proof masses are generally electrically grounded, the pickoff plates are typically formed of a conductive material, such as a metal, and a charge is maintained thereupon. In this regard, the micromechanical inertial sensor also includes a voltage source 28 generally connected to each pickoff plate for providing electrical charge to each pickoff plate. By measuring the movement of charge or current in the electrical circuit that includes the pickoff plate, i.e., the sense circuitry, a measure of the movement of the respective proof mass and, in turn, a measure of the rotation of the micromechanical inertial sensor about the first axis can be obtained.

The movement of each proof mass 14 along the third axis in response to a constant rate of rotation of the micromechanical inertial sensor 10 about the first axis 18 is at the predetermined motor frequency at which the proof masses are driven to vibrate along the second axis 20. However, the configuration of the micromechanical inertial sensor also establishes a natural resonant frequency, termed the pickoff natural resonant frequency, along the third axis which is near, but not equal to the motor natural resonant frequency. In this regard, the pickoff natural resonant frequency is typically no more than one or two kilohertz offset from the predetermined motor frequency. As explained above, conventional micromechanical inertial sensors are configured such that the pickoff resonance, i.e., the resonance at the pickoff natural resonant frequency, has an undesirably high Q, such as 100,000. In order to substantially reduce the pickoff Q while not significantly decreasing the motor Q, the micromechanical inertial sensor of the present invention includes a resistive element 30, such as a resister, disposed in series between the voltage source 28 and each pickoff plate 26. In order to explain the manner in which the resistive element reduces the pickoff Q, reference is made to FIG. 2.

Figure 2:
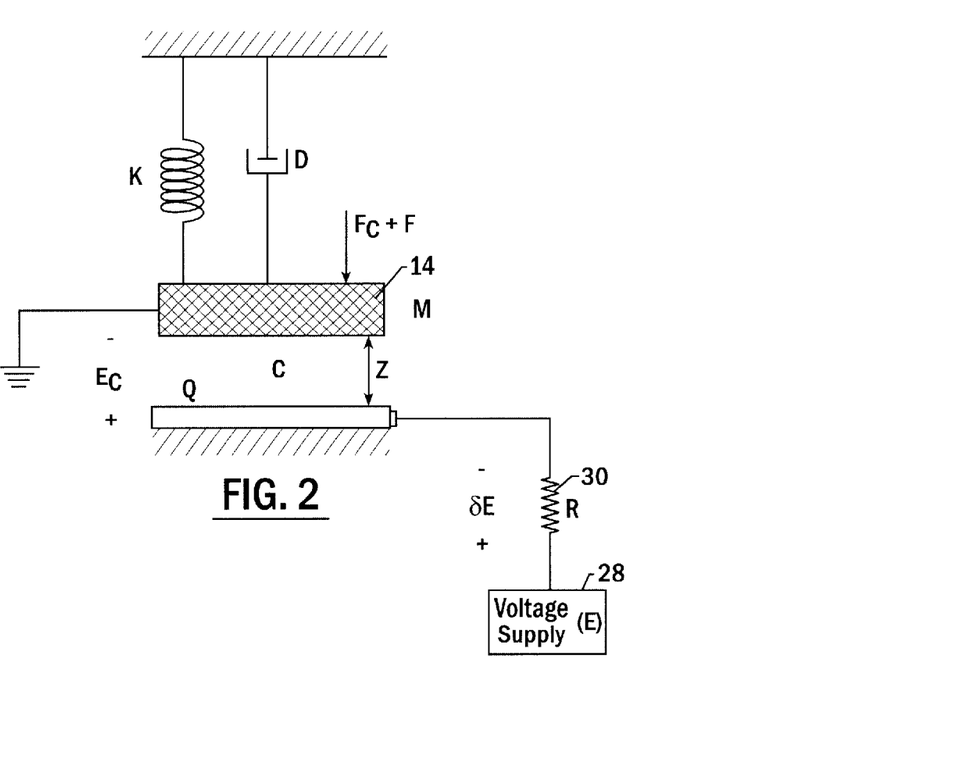
FIG. 2 is a graphical representation of a portion of the micromechanical inertial sensor of FIG. 1 depicting the relationship of a proof mass and a respective pickoff plate.

The relationship between a respective proof mass 14 and the underlying pickoff plate 26 can be represented as shown in FIG. 2. In this regard, the proof mass has mass M and is connected to mechanical ground through a spring K and a damper D. The proof mass is also subjected to forces, namely, force $F_c$ attributable to the electric field across the gap and a force F due to the Coriolis forces created by rotation of the micromechanical inertial sensors 10 about the first axis 18. Additionally, the proof mass is electrically grounded. As shown, the pickoff plate is also mechanically grounded and maintains an electric charge Q. As shown, the pickoff plate is also connected to a voltage source E. According to the present invention, a resistive element R is disposed between the voltage source and the pickoff plate to reduce the pickoff Q. Finally, the gap has a width z, a capacitance C and a gap voltage $E_c$.

In order to demonstrate the manner in which the resistive element R lowers the pickoff Q of the micromechanical inertial sensor 10, the following mathematical analysis is provided. In this regard, the electrical situation is set forth in the following equations in which the charge Q upon the pickoff plate 26 is written as a function of the independent variable E:

$$Q=CE_c$$

$$E_c=E-R\dot{Q}$$

$$\dot{Q}+(RC)^{-1}Q=R^{-1}E$$

where, in general terms, $\dot{y}$ means the derivative of y with respect to time. In the above-equation, for example, $\dot{Q}$ means the derivative of Q with respect to time.

Additionally, the following equation defines the mechanical state of the tuning fork pickoff mode wherein that mode is represented as a single spring-mass system with F representing Coriolis force and $F_c$ representing the force from the electric field within the pickoff capacitor:

$$M\ddot{z}+D\dot{z}+K(z-z|_{forces=0})=-F-F_c$$

where $z|_{forces}$=is the gap value when no forces are exerted on the proof mass 14.

Thus, the force on the proof mass 14 due to the electric field can be defined as:

$$F_c = \frac{1}{2}Q^2 \frac{d}{dz}C^{-1}.$$

such that the equation defining the mechanical situation can be rewritten as:

$$M\ddot{z} + D\dot{z} + K(z-z|_{forces=0}) = -F - \frac{1}{2}Q^2\frac{d}{dz}C^{-1}$$

The resulting two equations provide for two unknown dependent variables, Q and z. Unfortunately, these equations involve nonlinear functions of the dependent variables. As such, a perturbative solution to the equations will be calculated. In this regard, it is assumed that the baseline solution for Q and z (namely $Q_0$ and $z_0$) in response to the baseline excitations, $E_0$ and $F_0$, is known. As a result, the response perturbations, $\delta Q$ and $\delta z$, resulting from excitation perturbations, $\delta E$ and $\delta F$, can be determined as set forth below.

Neglecting fringing, tilting and cupping which are insignificant in the present application, the effects of perturbations in the gap width z on the capacitance C are as follows:

$$C^{-1} = \frac{z}{C_0 z_0}$$

$$\frac{d}{dz}C^{-1} = \frac{1}{C_0 z_0}$$

$$\delta C^{-1} = \frac{\delta z}{C_0 z_0}$$

$$\delta \frac{d}{dz}C^{-1} = 0$$

Perturbing the equation defining the electrical situation and making substitutions based on the foregoing equations yield the following:

$$\delta\dot{Q}+R^{-1}\delta C^{-1}C_0+R^{-1}C_0^{-1}\delta Q=R^{-1}\delta E$$

$$\delta\dot{Q}+R^{-1}C_0^{-31}{}^1\delta Q+(RC_0z_0)^{-1}Q_0\delta z=R^{-1}\delta E$$

Similarly, perturbing the equation defining the mechanical situation and making substitutions based on the foregoing equations yields the following:

$$M\delta\ddot{z}+D\delta\dot{z}+K\delta z=-\delta F-Q_0C_0^{-1}z_0^{-1}\delta Q$$

$$Q_0C_0^{-1}z_0^{-1}\delta Q+M\delta\ddot{z}+D\delta\dot{z}+K\delta z=-\delta F$$

This results in linear differential equations for the perturbed dependent variables, $\delta Q$ and $\delta z$. Additionally, the baseline values $Q_0, z_0, E_0, F_0$, have not been restricted to be constants in time, so the linear differential equations could have time varying coefficients. For the instant case, however, the baseline values are constants, thereby simplifying the solution of the equations. In this regard, after Laplace transforming, the final perturbed equations representing the electrical and mechanical situations can be written as the following matrix equations:

$$\begin{bmatrix} s+(RC_0)^{-1} & (RC_0z_0)^{-1}Q_0 \\ (C_0z_0)^{-1}Q_0 & Ms^2+Ds+K \end{bmatrix} \begin{bmatrix} \delta Q \\ \delta z \end{bmatrix} = \begin{bmatrix} R^{-1}\delta E \\ -\delta F \end{bmatrix}$$

Hence, the solution of these equations is:

$$\frac{1}{\Delta}\begin{bmatrix} Ms^2+Ds+K & -(RC_0z_0)^{-1}Q_0 \\ -(C_0z_0)^{-1}Q_0 & s+(RC_0)^{-1} \end{bmatrix}\begin{bmatrix} R^{-1}\delta E \\ -\delta F \end{bmatrix} = \begin{bmatrix} \delta Q \\ \delta z \end{bmatrix}$$

Where $$\Delta = (Ms^2+Ds+K)(s+(RC_0)^{-1})-Q_0^2R^{-1}(C_0z_0)^{-2}$$

The function of interest is $\delta Q/\delta F$ which defines as the charge moved per Coriolis force acting upon the proof mass 14 can be defined as:

$$\frac{\delta Q}{\delta F} = \frac{z_0^{-1}Q_0}{(MRC_0)s^3+(DRC_0+M)s^2+(KRC_0+D)s+(K-Q_0^2C_0^{-1}z_0^{-2})}$$

To determine the manner in which varying the resistive element R effects the response near resonance, it is instructive to examine the poles, that is, the zeros of the denominator. Following the root locus approach, the poles are located at the s-values satisfying the equation $\Delta=0$, or $$0 = 1 + R \times \frac{C_0s(Ms^2+Ds+K)}{Ms^2+Ds+K-Q_0^2C_0^{-1}z_0^{-2}}$$

The rational s-function multiplying R is called the open-loop transfer function (OLTF) in the usual root locus problem context. The zeros of $\Delta$ are the OLTF poles for R=0, and move to the OLTF zeros, as R increases, along an s-plane path for which the argument of the OLTF is 180°. The OLTF has zeros at the s-plane origin and at the pickoff natural resonant frequency, about 18 kHz, very near the $j\omega$ axis. The OLTF poles are located a few hundred hertz lower than the open loop zeros. As R increases from zero to infinity, the poles of $\delta Q/\delta F$ move along a semi-circle in the left hand s-plane from the OLTF poles to the OLTF zeros. Thus, as desired, inserting a resistive element 30 in the sense circuit increases the damping of the pickoff resonance.

To illustrate the magnitude by which the resistive element 30 increases pickoff resonance damping, the following equations are defined in which pickoff resonance "Q" is defined as $Q_r$:

$$Q_r = \left|\frac{\left(\frac{\delta Q}{\delta F}\right)\Big|_{s=j\omega_{pickoff\_peak}}}{\left(\frac{\delta Q}{\delta F}\right)\Big|_{s=0}}\right|$$

In order to determine the frequency at which $\delta Q/\delta F$ peaks it is safely assumed that the terms involving D and R in the $\delta Q/\delta F$ denominator are small relative to the other terms present in the equation and thus can be ignored in this instance. Therefore, the peak $\delta Q/\delta F$ value must occur where the $s^2$ and $s^0$ denominator terms cancel, i.e., where s equals $j\omega$, with $\omega_r$ defined as:

$$\omega_r = \sqrt{M^{-1}(K-Q_0^2C_0^{-1}z_0^{-2})}$$

In this regard, neglecting second order terms in D and/or R yields the following equations:

$$\left(\left(\frac{\delta Q}{\delta F}\right)\right)_{s=jw_r} = \frac{z_0^{-1} Q_0}{(D + RQ_0^2 z_0^{-2})(j\omega_r)}$$

$$\left.\frac{\delta Q}{\delta F}\right|_{s=0} = \frac{z_0^{-1} Q_0}{M\omega_r^2}$$

$$Q_r = \frac{M\omega_r}{D + RQ_0^2 z_0^{-2}}$$

Figure 3:
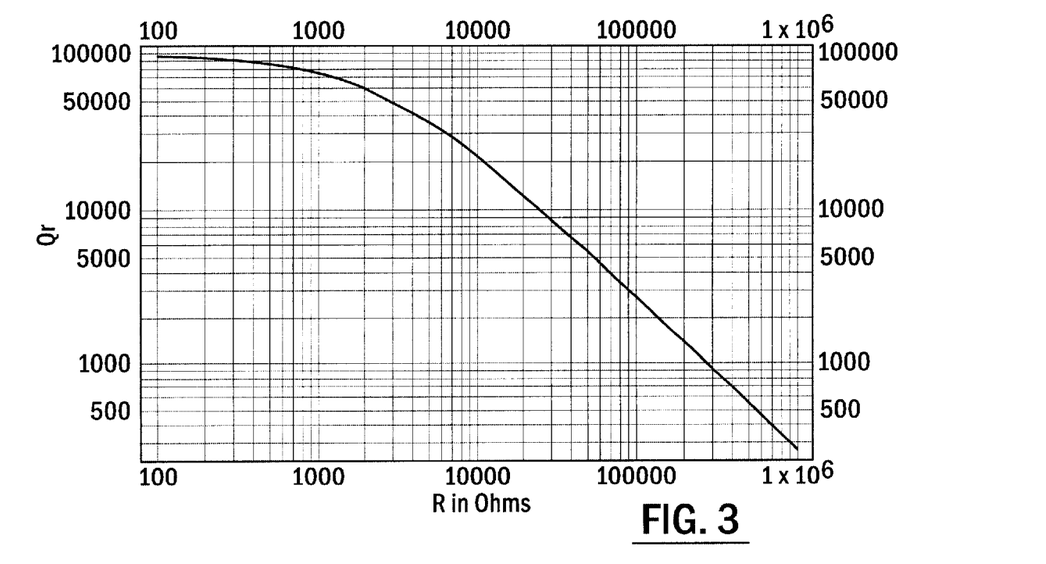
FIG. 3 is a graph depicting the pickoff Q as a function of the resistive element.

Therefore, in a hypothetical embodiment of the present invention, the variables may be defined as follows:

$M = 2.52E - 9$ kg $K = 32.2$ N/m $z_0 = 2.5E - 6$ m $C_0 = 500E - 15$ F $Q_0 = C_0 E_0$ $E_0 = 5$ V $D = 2.85E - 6$ N/$_{m/s}$ $Q_r = 100,000$ with $R = 0$ To graphically illustrate the effect of a resistive element 30 of various sizes, FIG. 3 is a plot of the pickoff resonance $Q_r$ as a function of the resistance of the element R, in accordance with an exemplary embodiment of the present invention having the variables defined as set forth above. As illustrated and defined above, the pickoff resonance $Q_r$ is 100,000 when no resistance is provided. In the same regard, when the resistance is minimal (i.e., about 1kΩ), the resistance has very minimal effect on the pickoff resonance, $Q_r$. When the resistance is increased to about 10 kΩ, however, the pickoff resonance is reduced to about 20,000. If the resistance is further increased, to about 300 kΩ, the resulting pickoff resonance is advantageously reduced to about 1000.

As described above, a large pickoff response, defined as a large movement of electrical charge per application of Coriolis force upon the proof mass 14, at the motor frequency is desired in response to a constant rate of rotation about the first axis 18. In order to provide the desired mechanical gain for the vibration of the proof masses along the third axis in response to a constant rate of rotation, the motor natural resonant frequency and the pickoff natural resonant frequency are preferably separated by only one or two kilohertz. While advantageous for detecting the rotation of the micromechanical inertial sensor 10 at a constant rate of rotation, this relatively small separation between the motor natural resonant frequency and the pickoff natural resonant frequency, together with the high pickoff Q of a conventional tuning fork gyroscope, is disadvantageous when a sinusoidal rotation rate of frequency near the frequency separation between the motor natural resonant frequency and the pickoff natural resonant frequency is encountered. The Coriolis force produced has components at the motor frequency modulated by the frequency at which the rate of rotation of the micromechanical inertial sensor is varied. When one of these sidebands coincides with the high pickoff Q at the pickoff natural resonant frequency, an undesirably large response is produced. By incorporating a resistor 30 between the voltage source 28 and each pickoff plate 26, however, the pickoff Q can be substantially reduced such that even if the frequency at which the micromechanical inertial sensor is rotating nears the separation between the motor natural resonant frequency and the pickoff natural resonant frequency, the pickoff resonance will not adversely effect the vibration of the proof mass and the resulting measurements of the rate of rotation of the micromechanical inertial sensor. The addition of the resistor reduces pickoff Q, which is advantageous, without reducing motor Q, which would be disadvantageous.

Figure 4:
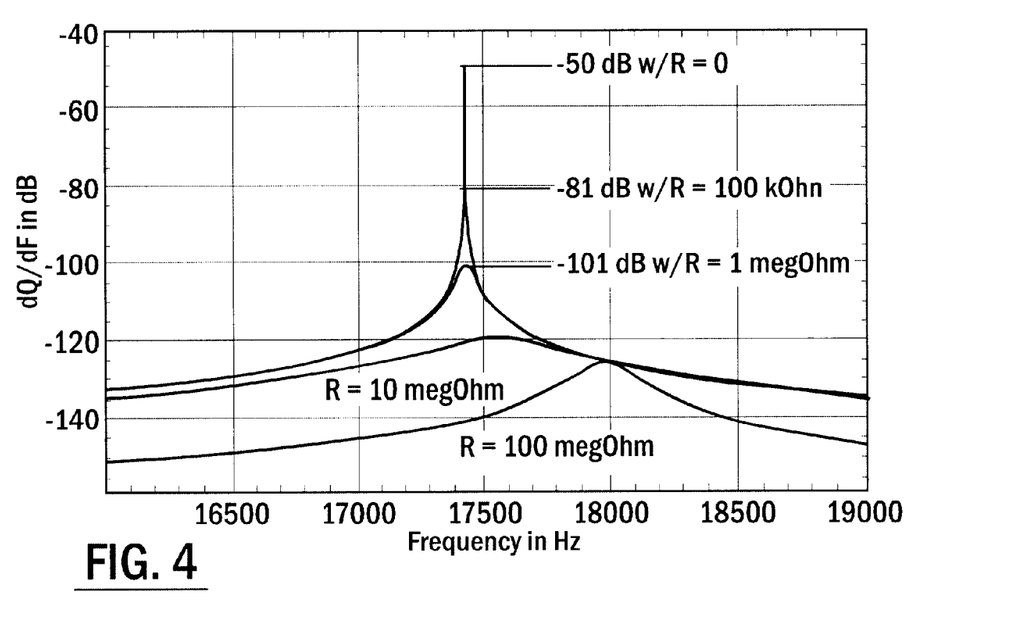
FIG. 4 is a graph depicting a response of a micromechanical inertial sensor as measured in the electrical charge that is moved per Coriolis force as a function of frequency for resistive elements of different sizes ranging from 0 ohms to 100 megohms.

FIG. 4 shows the magnitude of pickoff charge response to Coriolis forces (dQ/dF) at various frequencies. The curves depicted in FIG. 4 are plots of the equations derived above for the parameter set given above. As shown, for a resistor 30 having a value of 1 megohm, the peak pickoff mode response is decreased by 51 dB, with little change in response at lower frequencies. For larger resistor values, desirable peak reduction occurs, but at the price of reduced response at lower frequencies.

By appropriately diminishing the pickoff Q, the micromechanical inertial sensor 10 of the present invention can continue to provide mechanical amplification of the vibration of each proof mass 14 along the third axis in response to rotation of the micromechanical inertial sensor about the first axis 18 at frequencies within the intended bandwidth of the sensor. However, in instances in which the rate of rotation of micromechanical inertial sensor is varying at a frequency near the separation between the motor frequency and the pickoff natural resonant frequency, the reduced pickoff Q will permit the micromechanical inertial sensor to continue to operate and will not disadvantageously cause the proof mass to vibrate excessively.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A micromechanical inertial sensor adapted to sense rotation about a first axis, the micromechanical inertial sensor comprising:

a substrate;

first and second proof masses spaced apart from and mechanically connected to said substrate, said proof masses adapted to vibrate along a second axis substantially orthogonal to the first axis, said proof masses also being movable along a third axis substantially orthogonal to the first and second axes;

a plurality of pickoff plates in at least partial alignment with respective proof masses, said pickoff plates spaced from said proof masses by a gap that varies in response to movement of said proof masses along the third axis;

at least one voltage source electrically connected to said pickoff plates; and a plurality of resistive elements disposed in series between the at least one voltage source and respective pickoff plates to reduce pickoff resonance of the micromechanical inertial sensor.

2. A micromechanical inertial sensor according to claim 1 wherein each resistive element is sized to between 10 kiloohms and 10 megohms.

3. A micromechanical inertial sensor according to claim 2 wherein each resistive element is sized to be 1 megohm.

4. A micromechanical inertial sensor according to claim 1 wherein each resistive element is selected such that the pickoff resonance has a Q of no more than 1000.

5. A micromechanical inertial sensor according to claim 1 further comprising a plurality of drive electrodes, wherein each proof mass carries a plurality of driven electrodes that are interdigitated with said drive electrodes such that electrical stimuli applied to said drive electrodes induces vibration of the respective proof mass along the second axis.

6. A micromechanical tuning fork gyroscope adapted to sense rotation about a first axis, the micromechanical tuning fork gyroscope comprising:

first and second proof masses operably connected to mechanical ground and adapted to vibrate along a second axis substantially orthogonal to the first axis, said proof masses also being movable along a third axis substantially orthogonal to the first and second axes in response to rotation about the first axis;

a plurality of pickoff plates in at least partial alignment with respective proof masses and capacitively coupled thereto such that capacitance established between said pickoff plates and said proof masses provides a measure of movement of said proof masses along the third axis;

at least one voltage source electrically connected to said pickoff plates; and a plurality of resistive elements disposed in series between said at least one voltage source and respective pickoff plates to increase pickoff resonance damping of the micromechanical tuning fork gyroscope.

7. A micromechanical tuning fork gyroscope according to claim 6 wherein each resistive element is sized to between 10 kiloohms and 10 megohms.

8. A micromechanical tuning fork gyroscope according to claim 7 wherein each resistive element is sized to be 1 megohm.

9. A micromechanical tuning fork gyroscope according to claim 6 wherein the plurality of resistive elements also reduce pickoff resonance of the micromechanical tuning fork gyroscope, and wherein each resistive element is selected such that the pickoff resonance has a Q of no more than 1000.

10. A micromechanical tuning fork gyroscope according to claim 6 further comprising a plurality of drive electrodes, wherein each proof mass carries a plurality of driven electrodes that are interdigitated with said drive electrodes such that electrical stimuli applied to said drive electrodes induces vibration of the respective proof mass along the second axis.

11. A micromechanical inertial sensor adapted to sense rotation about a first axis, the micromechanical inertial sensor comprising:

a substrate;

first and second proof masses spaced apart from and mechanically connected to said substrate, said proof masses adapted to vibrate along a second axis substantially orthogonal to the first axis, said proof masses also being movable along a third axis substantially orthogonal to the first and second axes in response to rotation about the first axis;

a plurality of pickoff plates disposed upon said substrate in at least partial alignment with respective proof masses, said pickoff plates spaced from said proof masses by a gap that varies in response to movement of said proof masses along the third axis;

at least one voltage source electrically connected to said pickoff plates; and a plurality of resistive elements disposed in series between the at least one voltage source and respective pickoff plates, said resistive elements being sized between 10 kiloohms and 10 megohms.

12. A micromechanical inertial sensor according to claim 11 wherein each resistive element is sized to be 1 megohm.

13. A micromechanical inertial sensor according to claim 11 wherein the plurality of resistive elements also reduce pickoff resonance of the micromechanical tuning fork gyroscope, and wherein each resistive element is selected such that the pickoff resonance has a Q of no more than 1000.

14. A micromechanical inertial sensor according to claim 11 further comprising a plurality of drive electrodes, wherein each proof mass carries a plurality of driven electrodes that are interdigitated with said drive electrodes such that electrical stimuli applied to said drive electrodes induces vibration of the respective proof mass along the second axis.

* * * * *

UNITED STATES PATENT AND TRADEMARK OFFICE
CERTIFICATE OF CORRECTION

PATENT NO. : 6,598,475 B2
DATED : July 29, 2003
INVENTOR(S) : Pinson

It is certified that error appears in the above-identified patent and that said Letters Patent is hereby corrected as shown below:

Column 7,
Line 48, the formula should appear as follows:
$$\delta\dot{Q} + R^{-1}\delta C^{-1}C_0 + R^{-1}C_0^{-1}\delta Q = R^{-1}\delta E$$
$$\delta\dot{Q} + R^{-1}C_0^{-1}\delta Q + (RC_0z_0)^{-1}Q_0\delta z = R^{-1}\delta E$$

Column 8,
Lines 1-4, the formula should appear as follows:
$$\begin{bmatrix} s+(RC_0)^{-1} & (RC_0z_0)^{-1}Q_0 \\ (C_0z_0)^{-1}Q_0 & Ms^2+Ds+K \end{bmatrix}\begin{bmatrix}\delta Q \\ \delta z\end{bmatrix} = \begin{bmatrix} R^{-1}\delta E \\ -\delta F \end{bmatrix}$$

Lines 29-31, the formula should appear as follows:
$$0 = 1 + R \times \frac{C_0 s(Ms^2+Ds+K)}{Ms^2+Ds+K-Q_0^2 C_0^{-1} z_0^{-2}}$$

Lines 51-55, the formula should appear as follows:
$$Q_r = \frac{\left|\frac{\delta Q}{\delta F}\right|_{s=jw_{pickoff\_peak}}}{\left|\frac{\delta Q}{\delta F}\right|_{s=0}}$$

Column 9,
Lines 1-6, the first two formulas should appear as follows:

$$\left.\frac{\delta Q}{\delta F}\right|_{s=jw_r} = \frac{z_0^{-1}Q_0}{(D+RQ_0^2 z_0^{-2})(j\omega_r)}$$

$$\left.\frac{\delta Q}{\delta F}\right|_{s=0} = \frac{z_0^{-1}Q_0}{M\omega_r^2}$$

Column 12,
Lines 33-34, "tuning fork gyroscope" should read -- inertial sensor --

Signed and Sealed this

Twenty-fifth Day of November, 2003

JAMES E. ROGAN
*Director of the United States Patent and Trademark Office*